(No Model.) 2 Sheets—Sheet 1.
G. A. CANNOT.
APPARATUS FOR THE MANUFACTURE OF CHLORIN MONOXID.
No. 523,262. Patented July 17, 1894.
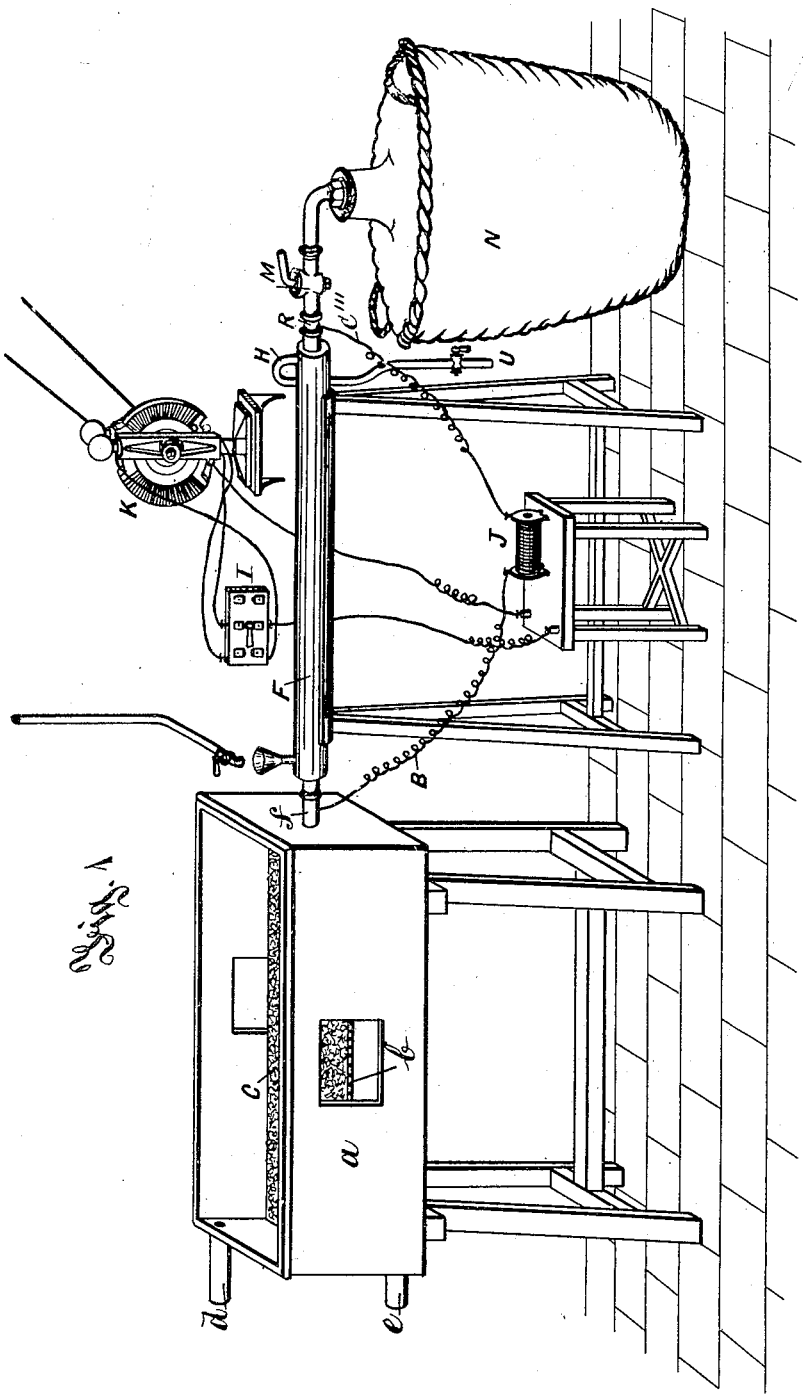

(No Model.) 2 Sheets—Sheet 2.
G. A. CANNOT.
APPARATUS FOR THE MANUFACTURE OF CHLORIN MONOXID.
No. 523,262. Patented July 17, 1894.
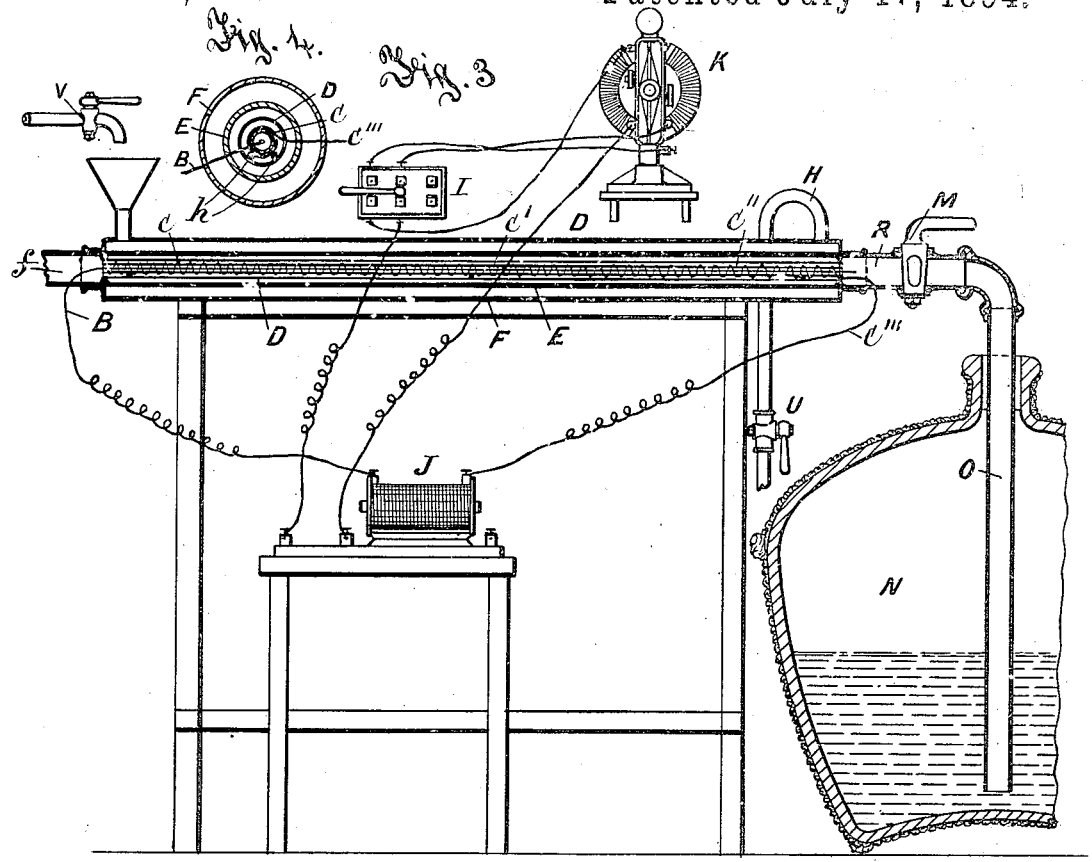
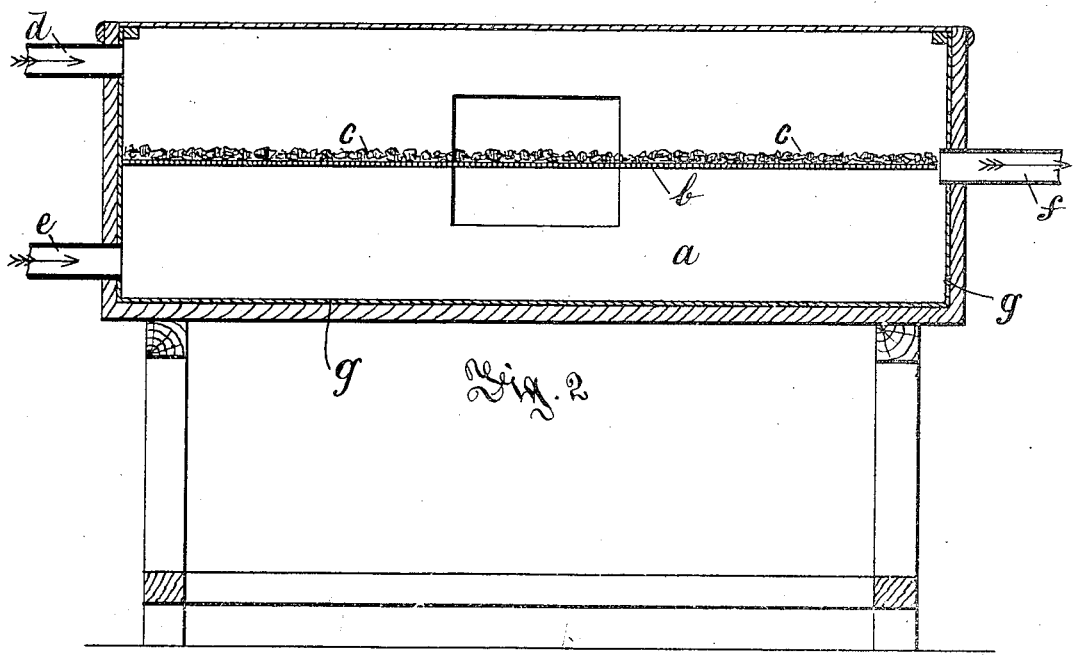

UNITED STATES PATENT OFFICE.

GUSTAVE ADOLPHE CANNOT, OF LONDON, ENGLAND.

APPARATUS FOR THE MANUFACTURE OF CHLORIN MONOXID.

SPECIFICATION forming part of Letters Patent No. 523,262, dated July 17, 1894.

Application filed September 22, 1893. Serial No. 486,216. (No model.) Patented in England August 1, 1891, No. 13,102; in France September 18, 1891, No. 216,200; in Belgium September 18, 1891, No. 96,437, and in Austria-Hungary October 5, 1892, No. 21,771.

*To all whom it may concern:*

Be it known that I, GUSTAVE ADOLPHE CANNOT, manufacturer, a subject of the Queen of Great Britain, residing at London, in the county of Middlesex, England, have invented certain new and useful Improvements in Apparatus for the Manufacture of Chlorin Monoxid, (for which I have obtained Letters Patent of Great Britain, dated August 1, 1891, No. 13,102; of France, dated September 18, 1891, No. 216,200; of Belgium, dated September 18, 1891, No. 96,437, and of Austria-Hungary, dated October 5, 1892, No 21,771,) of which the following is a specification.

The accompanying drawings are in illustration of my invention, Figure 1 being a view showing the gas mixing and oxidizing apparatus in combination. Fig. 2 is a section, upon a larger scale of the gas mixing apparatus, and Fig. 3 of the gas oxidizing apparatus, and Fig. 4 is a cross section of the gas oxidizing apparatus.

The same letters of reference indicate the same parts in the several figures.

The process is as follows:—Oxygen and chlorine gases are simultaneously produced in separate generators and are combined later in ozone tubes, as will be hereinafter described. The chlorine gas on leaving its generator is allowed to bubble up through a solution of chloride of sodium, and the oxygen gas through plain water, contained in suitable vessels, and from thence they pass through washing vessels where they leave any remaining impurities, and into a receiver where they are dried and mixed together, and from which they pass together into an apparatus kept cool by a current of cold water, in which they are submitted to the action of a stream of electric sparks. The mixed gases combine in this apparatus, that is to say the chlorine attaining its required degree of oxidation passes into the state of hypochlorous monoxide ($Cl_2O$), which being unstable and dangerous in a free state is passed into an alkaline solution such as caustic soda or potash, by which it is absorbed.

The oxygen gas is produced, preferably by the action of sulphuric acid upon peroxide of manganese, in a vessel of ovoid form and surrounded by a jacket into which steam can be admitted to heat it.

The chlorine gas is produced in a similar jacketed vessel, and in a somewhat similar way to the oxygen, by the action of hydrochloric acid upon peroxide of manganese.

The chlorine and oxygen gases, after leaving the washing vessels pass separately to a drying and mixing apparatus shown in Figs. 1 and 2, common to both, where they are dried and mixed together. This apparatus consists of a rectangular box $a$ lined with glass $g$ and having at its opposite sides and top, windows of transparent glass through which the interior can be observed, and having a perforated partition $b$ upon which are placed fragments of pumice stone $c$ impregnated with sulphuric acid, or other desiccating material. The chlorine gas is admitted above through the pipe $d$ and has a specific gravity of 1.33, while the oxygen admitted below through the pipe $e$ has a specific gravity of only 1.05, so that the former has a tendency to pass down through the perforations in the partition $b$, while the latter tends to rise up through them. As fresh bubbles of both gases are constantly arriving they become mixed together and dried, and pass forward and out through a pipe $f$ at the other end of the box $a$, through which they pass to the oxidizing apparatus, Fig. 1, shown on a larger scale in Fig. 3, the object of which is to render the oxidation of the chlorine much more energetic, by the presence of ozone in the air, thus obtaining considerable advantage, in which however the liability to dangerous explosions has to be guarded against where they pass together through tubes in which they are subjected to the action of electric sparks. To avoid such explosions, or to render them harmless if, in spite of precautions they should occur, a glass tube $C$, $C'$, $C''$ (Fig. 3) about 0.008 millimeter diameter and 0.002 millimeter thick, and about 1.50 millimeters long, is arranged horizontally, through the center of which passes a copper wire $B$, coated with silver, gold, or preferably platinum. This wire ends at a short distance (about 0.05 millimeter) from the outer end of the tube, $C''$, its other end $B$ being connected to one of the poles of an electrical induction coil J. Outside the tube C, C', C'', is coiled helically a similar wire C''' which ends at a short distance from the inner end of the tube, its other end being connected to the other pole of the induction coil J. The tube which carries the wires is inserted into a larger glass tube D, in the axis of which it is supported by small glass balls or supports $h$ shown in Fig. 4. The mixed gases pass through these tubes by the pipe $f$, from the mixing apparatus already described, and a stream of electric sparks which pass between the wires, from the induction coil, and through the inner glass tube, which cause the gases to combine rapidly together in the required proportions to form chlorine monoxide.

The tubes containing the gases are insulated in a porcelain tube E glazed inside which is itself contained in an outer case of thin metal F, through which a constant current of cold water is made to circulate from a cock V through a funnel, passing out through the pipe H and cock U.

The induction coil J is connected with a switch board I of any suitable construction, and is set in operation by a dynamo K, of sufficient power and of any suitable kind.

The combined gas (chlorine monoxide) is conveyed away through a pipe R provided with a cock or valve M and through a movable coupling tube R to a pipe O which descends nearly to the bottom of a vessel or carboy N, containing water in which it is entirely dissolved.

Having now fully described my invention, what I desire to secure by Letters Patent is—

1. The combination with the chamber $a$ provided with inlets $d$ and $e$ for the chlorine and oxygen respectively, at the upper and lower parts of one end thereof, and the porous partition $c$ carrying porous material moistened with sulphuric acid and running longitudinally in the said chamber, and the outlet $f$ for the mixed gases leading from the end of said chamber opposite said inlet pipes; of the apparatus for ozonizing the oxygen contained in said mixture of gases, and a vessel containing an alkaline solution for receiving the gaseous products connected to said ozone apparatus, substantially as and for the purposes described.

2. In an apparatus of the character described, the combination with means for preparing the chlorine and oxygen and drying and mixing the gases, and conducting the mixture to the ozonizing apparatus; of the ozone apparatus comprising the inner glass tube, the central wire B inclosed therein, the external coiled wire C, an electrical induction coil having its terminals connected to said wires, the larger glass tube D, the outer insulating tube E, and the outer water vessel F; and a vessel containing an alkaline solution for receiving the gaseous products connected to said ozone apparatus; substantially as and for the purposes described.

In testimony whereof I have hereunto set my hand in the presence of two witnesses.

GUSTAVE ADOLPHE CANNOT.

Witnesses:
C. EICHLER,
*Commercial Clerk, 20 Bucklersbury, London, E. C.*
C. LESLIE JOHNSON,
*Gentleman, 20 Bucklersbury, London, E. C.*